United States Patent

[11] 3,614,149

| [72] | Inventor | Walter L. Clark<br>Fresno, Calif. |
|---|---|---|
| [21] | Appl. No. | 846,775 |
| [22] | Filed | Aug. 1, 1969 |
| [45] | Patented | Oct. 19, 1971 |
| [73] | Assignee | Edward J. Derderian<br>Fresno, Calif.<br>a part interest |

[54] COMBINED GOLF BALL RETRIEVER AND RAKE
3 Claims, 9 Drawing Figs.
[52] U.S. Cl. .................................................... 294/19 A,
294/2, 294/24, 294/51
[51] Int. Cl. .................................................... B25f 1/04
[50] Field of Search ............................................ 294/2, 19.1,
24, 51; 306/11–17, 19, 6; 273/80.1

[56] References Cited
UNITED STATES PATENTS
2,098,609  11/1937  Bishop ........................ 306/13
2,270,632  1/1942  Hasty ......................... 294/19.1

*Primary Examiner*—Evon C. Blunk
*Assistant Examiner*—Johnny D. Cherry
*Attorney*—Huebner & Worrel ABSTRACT: A combined golf ball retriever and rake having an elongated raking head provided with a golf ball receiving member and an elongated handle pivotally mounted on the head for movement between a raking position extended in substantially right-angular relation from the head and a ball retrieving position extended substantially longitudinally coextensively along the head.

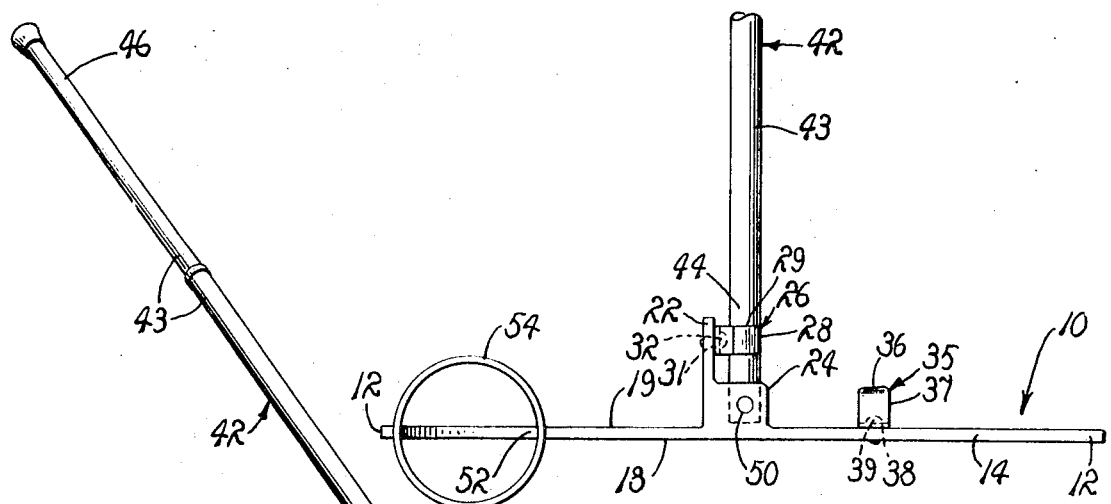
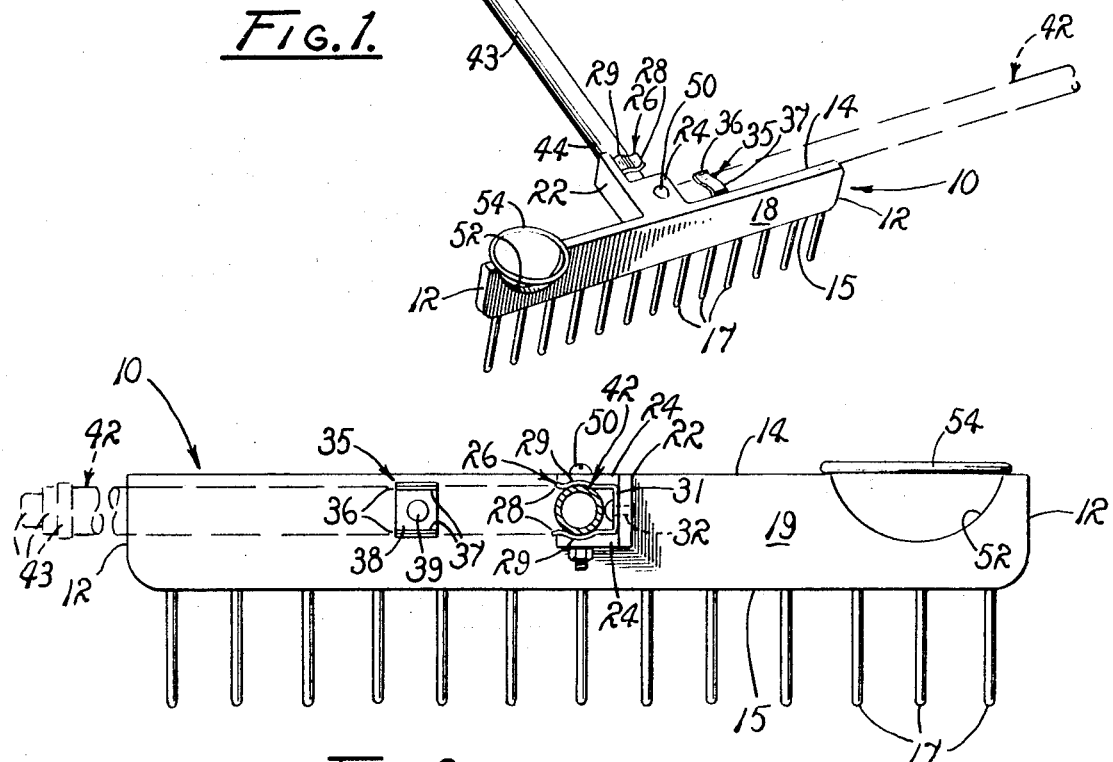

PATENTED OCT 19 1971 3,614,149
SHEET 2 OF 2
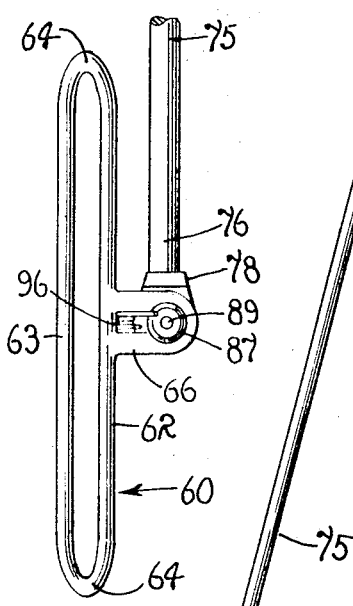
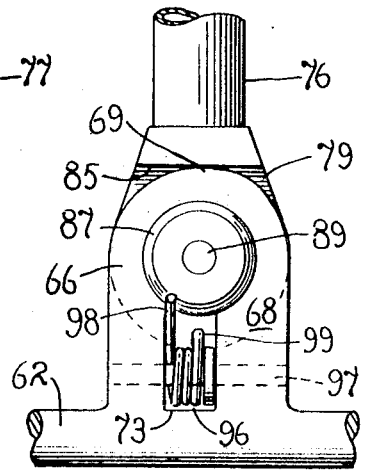
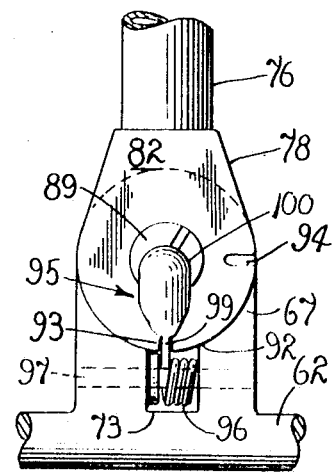
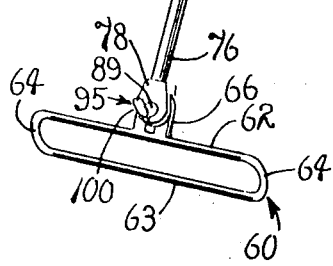
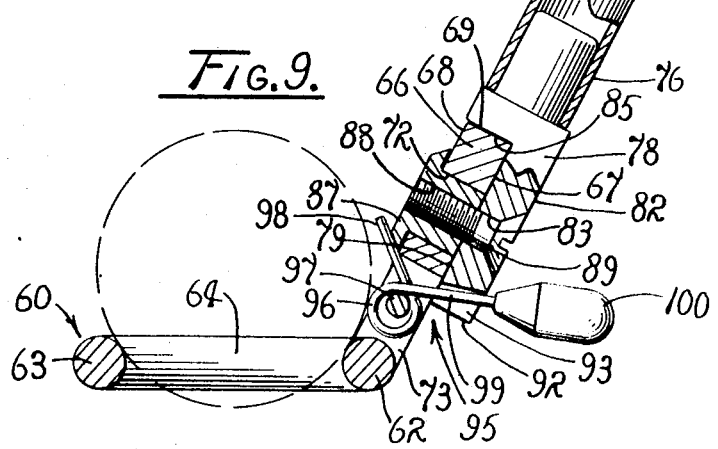
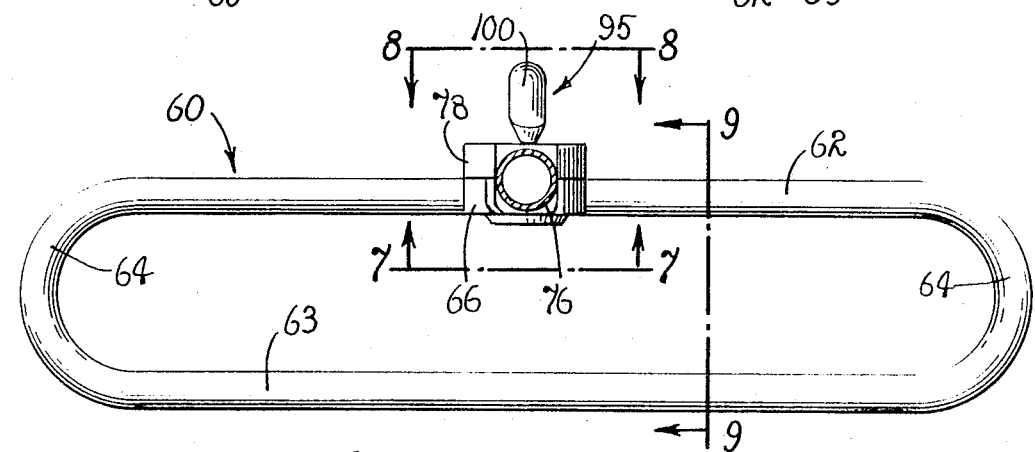
WALTER L. CLARK
INVENTOR
Huebner & Worrel
ATTORNEYS

COMBINED GOLF BALL RETRIEVER AND RAKE

BACKGROUND OF THE INVENTION

Conventional rakes are provided for raking sand traps on golf courses to remove footprints, ball marks, and other ball-entrapping indentations from the sand. Such rakes usually provide an elongated spike forwardly extended from the raking head in coaxial relation to the oppositely extended handle for being driven into the ground to hold the rake in a substantially upright position adjacent to the sand trap so as to be readily observable and immediately available for use. Frequently, however, the rakes are not replaced in such vertical position by the preceding golfer and are left lying on the ground in a hazardous position to be stepped on or tripped over by succeeding golfers. Even when properly placed, the upwardly extended handle of the rake is often disposed in a direct line between the golfer and the hole, and must be moved prior to the shot. In many instances, the rakes are located at the opposite ends of the sand traps from the locations of the golfers in the traps and require time-consuming additional steps by the golfers to obtain the rakes and to return to remove footprints and the like from the sand. In view of such inconvenience, some golfers choose merely to accomplish the raking operation with the heads of their golf clubs which, of course, leaves the traps in less than optimum smooth condition.

An additional problem frequently encountered by golfers is the losing of their golf balls in the rough and in other hazards on the golf course such as bushes on the fairway with low-hanging branches and in lakes, ponds, and occasional water. Frequently, the golf balls may be visible but just out of reach of the golfers. In some instances, the ball is reachable with a golf club but the club head is not adapted to embrace or otherwise grasp the ball which is usually shoved farther away from the golfer, making recovery more difficult.

SUMMARY OF THE INVENTION

Accordingly, it is an object of the present invention to provide a combined golf ball retriever and rake which is adapted for smoothing sand traps on a golf course with a minimum of inconvenience to the golfer.

Another object is to provide a combined golf ball retriever and rake which is lightweight and has a collapsible foldable handle which can be conveniently carried by golfers to eliminate the usual hazards and inconveniences presented by conventional rakes on golf courses.

Another object is to provide a combined golf ball retriever and rake which is readily convertible from a raking position to a golf ball retrieving position for recovering golf balls from any of the usual hazards on a golf course.

Another object is to provide a combined golf ball retriever and rake that utilizes a telescopic handle which is easily and conveniently manipulatable between an extended operating position and a collapsible carrying position of a relatively compact size conveniently receivable within the golf bag of a golfer.

Another object is to provide a combined golf ball retriever and rake which has a raking head pivotally mounting the telescopic handle for movement between raking and ball-retrieving positions.

Another object is to provide a combined golf ball retriever and rake which includes a pair of latching members releasably dependably holding the handle in its raking and ball-retrieving positions.

Other objects and advantages of the present invention will subsequently become more clearly apparent upon reference to the following description and accompanying drawings.

BRIEF DESCRIPTION OF THE DRAWINGS

FIG. 1 is a perspective view of a combined golf ball retriever and rake embodying the principles of the present invention shown in a raking position.

FIG. 2 is a somewhat enlarged top plan view of the combined golf ball retriever and rake in the raking position of FIG. 1.

FIG. 3 is a somewhat enlarged rear elevation of the combined golf ball retriever and rake showing the handle in a dashed line ball-retrieving position.

FIG. 4 is a perspective view of a second form of combined golf ball retriever and rake disposed in raking adjustment.

FIG. 5 is a somewhat enlarged fragmentary top plan view of the combined golf ball retriever and rake of FIG. 4 disposed in an alternate ball-retrieving and/or storing adjustment.

FIG. 6 is a further enlarged bottom plan view of the second form of ball retriever and rake.

FIG. 7 is a further enlarged rear elevation of the second form of ball retriever and rake, as viewed in the direction of the arrows on line 7—7 of FIG. 6.

FIG. 8 is an enlarged fragmentary front elevation of the second form of ball retriever and rake, as viewed in the direction of the arrows on line 8—8 of FIG. 6.

FIG. 9 is an enlarged fragmentary transverse vertical section through the second form of combined ball retriever and rake, taken on line 9—9 of FIG. 6.

DESCRIPTION OF THE PREFERRED EMBODIMENTS

Referring more particularly to the drawings, a combined golf ball retriever and rake is shown in FIG. 1 in operating adjustment for use as a rake. The device provides an elongated raking head 10 constructed of an elongated substantially flat bar of lightweight substantially rigid material, such as aluminum or the like, having opposite ends 12 and opposite upper and lower edges 14 and 15, respectively. A plurality of longitudinally spaced raking tines or teeth 17 are extended in depending relation from the lower edge of the raking head which may be constructed integrally with the head or rigidly secured thereto by extension into suitable bores in the head, not shown, as may be desired. The raking head further includes opposite forward and rearwardly disposed side surfaces 18 and 19, respectively.

An elongated handle bracing arm 22 is integrally outwardly extended from the rearward side surface 19 of the raking head 10 in substantially right-angular relation thereto intermediate the ends 12 of the head. A pair of handle mounting brackets 22 are formed in integrally interconnecting relation between the head and the bracing arm in spaced substantially parallel relation to each other. A substantially U-shaped handle retaining latch 26 of spring steel material is mounted on the bracing arm 22 in rearwardly spaced relation from the brackets 24. The latch provides a pair of opposite springable legs 28 having arcuately cupped portions 29 and a bight portion 31 secured to the bracing arm by a rivet 32 or other suitable fastener member. A similarly constructed latch 35 having opposite springable legs 36 providing arcuately cupped portions 37 and a bight portion 38 is secured by a rivet 39 to the rearward side surface 19 of the raking head intermediate the brackets 24 and the adjacent end 12 of the raking head.

An elongated raking handle 42 of a lightweight tubular material, such as aluminum alloy or the like, is extended from the rearward side surface 19 of the raking head 10. The handle includes a plurality of axially telescoping sections 43 which provide an inner mounting end 44 and an opposite gripping end 46. The mounting end 44 of the handle is receivable between the brackets 24 and mounted for pivotal movement about a pivot bolt and nut assembly 50 extended through the brackets and the handle.

The raking head 10 of the present invention further includes a semicircular notch 52 which is formed in the upper edge 14 of the head closely adjacent to one of its ends 12. A substantially circular rigid ring 54 is secured to the upper edge 14 of the raking head, as by welding or the like, in symmetrical bridging relation to the notch 52. The ring is of a diameter freely to receive a golf ball therethrough and combines with the notch to provide a ball retaining cage with the ring holding the golf ball in nested relation within the notch.

SECOND FORM

A second form of combined golf ball retriever and rake embodying the principles of the present invention is shown in FIGS. 5 through 9. The second form has an elongated raking head 60 constructed of an endless rod formed into an elongated continuous loop. The loop has oppositely spaced substantially parallel inner and outer sides 62 and 63, respectively, and opposite arcuately curved ends 64. The head is preferably cast from a lightweight, substantially rigid material such as aluminum or the like, with the outer side rod 63 providing a lower, substantially straight, raking tine for smoothing the sand in golf course sand traps and the like.

An elongated handle mounting arm 66 is integrally outwardly extended from the inner side rod 62 of the head 60 in obtuse angular relation to the plane of the rod. The arm provides substantially flat spaced parallel forward and rearward surfaces 67 and 68, respectively, and an arcuately curved nose portion 69. The radius of the nose emanates from a center point laterally offset slightly to the right of the longitudinal axis of the arm, as shown in FIG. 7. A circular bore 72 is extended through the arm between its forward and rearward surfaces 67 and 68 and an elongated substantially rectangular slot is radially extended therefrom toward the inner side rod 62.

As best shown in FIG. 4, an elongated handle of tubular lightweight material, similar to the head 60, is provided having a lower mounting end 76 and an opposite upper hand gripping end 77. The handle 75 may be constructed in a plurality of axially telescoping sections similar to the handle 42 of the first form, if desired. A connector bracket 78 is mounted on the lower end of the handle and has an inner substantially flat surface 79 disposed in intimately facing sliding engagement with the forward surface 68 of the handle mounting arm 66. The bracket further includes an outer surface 82 having a countersunk bore 83 coaxially aligned with the bore 72 through the arm 66. The bracket further provides a shoulder 85 disposed in closely spaced adjacent relation to the nose portion 69 of the arm.

A bearing nut 87, having an internally threaded bore 88, is rotatably mounted within the bore 72 of the arm 66 and an elongated tapered head locking screw 89 is screw-threadably received therein rotatably to connect the arm and the connector bracket 78 for angular adjustment of the handle 75 relative to the head 60. The connector bracket provides an arcuately curved nose portion 92 having a notch 93 edgewardly disposed therein in substantial alignment with the longitudinal axis of the handle 75. A second notch 74 is edgewardly disposed in the connector bracket in substantially 90° spaced relation to the notch 93.

A latch mechanism 95 is mounted on the arm 66 of the head 60 for releasably holding the handle 75 in its described adjusted operating positions with respect to the head. The latch device includes a coiled torsion spring 96 disposed within the opening 73 by an elongated retaining pin 97 mounted in the arm 66. The spring has an anchor end 98 abutting the periphery of the bearing nut 87 adjacent to the opening and an opposite manipulating end 99 extended outwardly from the opening through the selected notch 93 or 94 in the connector bracket 78. The manipulating end of the spring mounts an enlarged gripping knob 100 for releasing the spring from the notches.

OPERATION OF FIRST FORM

The operation of the first embodiment of the subject invention, as shown in FIGS. 1 through 3, is believed to be clearly apparent and is briefly summarized at this point. Prior to use, the golf ball retriever and rake of the present invention is disposed in a compact carrying position for convenient storage within a golf bag, not shown. Such compact condition is shown in FIG. 3 with the handle 42 disposed in its collapsed dashed line position extended longitudinally along the raking head 10. The handle is retained in such position by the latch 35 on the rearward side surface 19 of the raking head with the handle nested between the arcuate cupped portions 37 of the springable legs 36.

When used as a golf ball retriever, the sections 43 of the handle 42 are axially extended to the desired length as may be required for the particular retrieving operation. The gripping end 46 of the handle is held and manipulated by the golfer to maneuver the distal end 12 of the raking head so as to capture the golf ball within the cage formed by the ring 54 and the notch 52. It will be noted that with such open cage structure, water, weeds, small rocks and other extraneous matter are permitted to pass therethrough without accumulating within the notch so as to eliminate any obstruction to the free entry of the golf ball into the cage.

When it is desired to employ the ball retriever and rake 10 of the present invention for use in raking sand traps and the like, the handle 42 is pivoted about the pivot bolt 50 by imposing a force thereagainst sufficient to overcome the spring tension of the legs 36 of the latch 35. Upon approaching its substantially right-angular full line position with respect to the raking head 10, the mounting end 44 of the handle is forced between the springable legs 28 of the latch 26 for movement within the arcuate cupped portions 29 thereof which dependably constrains the handle in its full line raking position. The sections 43 of the handle 42 may be axially adjusted to provide the desired length of handle for the raking operation. Upon completion of such raking operation, the handle is fully collapsed and returned to the dashed line position of FIG. 3 in locking position within the latch 35 and the raking head returned to the golf bag or other convenient carrying position.

OPERATION OF SECOND FORM

The operation of the second form of the present invention, as shown in FIGS. 5 through 9, is substantially similar to the operation of the first form with the exception that the second form provides a substantially longer ball retrieving slot between the inner and outer side rods 62 and 63. When employed as a rake, as shown in FIG. 4, the manipulating end 99 of the torsion spring 96 of the latch 95 is disposed within the notch 93 of the connector bracket 78. Accordingly, the head 60 is disposed in substantially right-angular relation to the longitudinal axis of the handle 75. The device may be employed, as shown in FIG. 4, with the outer side rod 63 downwardly spaced from the inner side rod 62 in which instance the outer side rod serves as a single substantially horizontal raking tine for smoothing the sand in golf course sand traps and the like. The device, however, may be inverted to the position shown in FIG. 9, and similarly used as a rake with both the inner and outer side rods 62 and 63 engaging the sand.

When it is desired to provide a longer golf ball retrieving extension for the device, or when it is desired compactly to fold the device to the position shown in FIG. 5, the knob 100 is manipulated to withdraw the manipulating end 99 of the torsion spring from the notch 93 and the handle is swung relative to the head 60 about the pivot screw 89. Such movement is continued until the manipulating end of the spring is aligned with the notch 94 for release thereof into lockin engagement with the connector bracket for holding the head 60 in spaced substantially parallel relation to the longitudinal axis of the handle. It will be noted that the handle is not permitted to swing in a clockwise direction relation to the head, as viewed in FIG. 7, by virtue of the offset radius of the arcuate nose portion of the arm 66. Upon retrieving a golf ball, the extended end 64 of the rod is positioned beneath the ball and the ball received in nested relation between the inner and outer side rods 62 and 63 thereof. Upon raising of the device, the ball is permitted to roll to the opposite end of the head in a more stable position for withdrawal of the ball from the hazard.

In view of the foregoing, it is readily apparent that the structure of both forms of the prevent invention provides an improved golf ball retriever and rake which can be conveniently carried by individual golfers to eliminate the usual hazards and inconveniences presented by conventional rakes on golf courses. The device is readily and conveniently convertible from its compact carrying or storage position and immediately usable as a rake and for retrieving golf balls from a wide variety of positions of difficult access or hazards on the golf course.

Although the invention has been herein shown and described in what are conceived to be the most practical and preferred embodiments, it is recognized that departures may be made therefrom within the scope of the invention.

Having described my invention, what I claim as new and desire to secure by Letters Patent is:

1. A combined golf ball retriever and rake comprising a raking head providing an elongated looped rod having oppositely spaced substantially parallel inner and outer sides with the latter providing a raking tine which with said inner side defines an elongated ball receiving slot therebetween, said raking head including a handle mounting arm outwardly extended from said inner side of the rod having an opening therethrough; an elongated handle; an edgewardly slotted connector bracket mounted on the handle and endwardly extended therefrom; means pivotally connecting said bracket to said arm for pivotal movement of the handle with respect to the head between a position extended in substantially right-angular relation from the head and a position extended substantially longitudinally of the head; and latch means borne by the head releasably to hold the handle in said positions comprising a torsion spring mounted in said opening of the arm having an outer manipulating end releasably engageable with the edgewardly slotted connector bracket for holding the handle selectively in said positions.

2. A combined golf ball retriever and rake comprising an elongated raking head having ball-receiving means and a raking tine; an elongated handle; means pivotally connecting the handle to the raking head for pivotal movement of the handle between a position extended in substantially right angular relation from the head and a position extended substantially longitudinally of the head, said connecting means including an edgewardly slotted connector bracket mounted on the handle; and latch means for releasably holding the handle in said positions comprising a torsion spring mounted on the head having an outer manipulating end releasably engageable with the edgewardly slotted connector bracket for holding the handle selectively in said positions.

3. The golf ball retriever and rake of claim 1 in which said bracket has a shoulder disposed in facing relation to said arm, and said arm has an arcuate nose portion adjacent to said shoulder curved about a radius emanating from a center disposed in somewhat laterally offset relation to the longitudinal axis of the arm so as to be rotated past the shoulder during movement of the handle to said longitudinally extended position but engaging the shoulder in blocking relation to rotary movement in the opposite direction.